No. 768,472. Patented August 23, 1904.

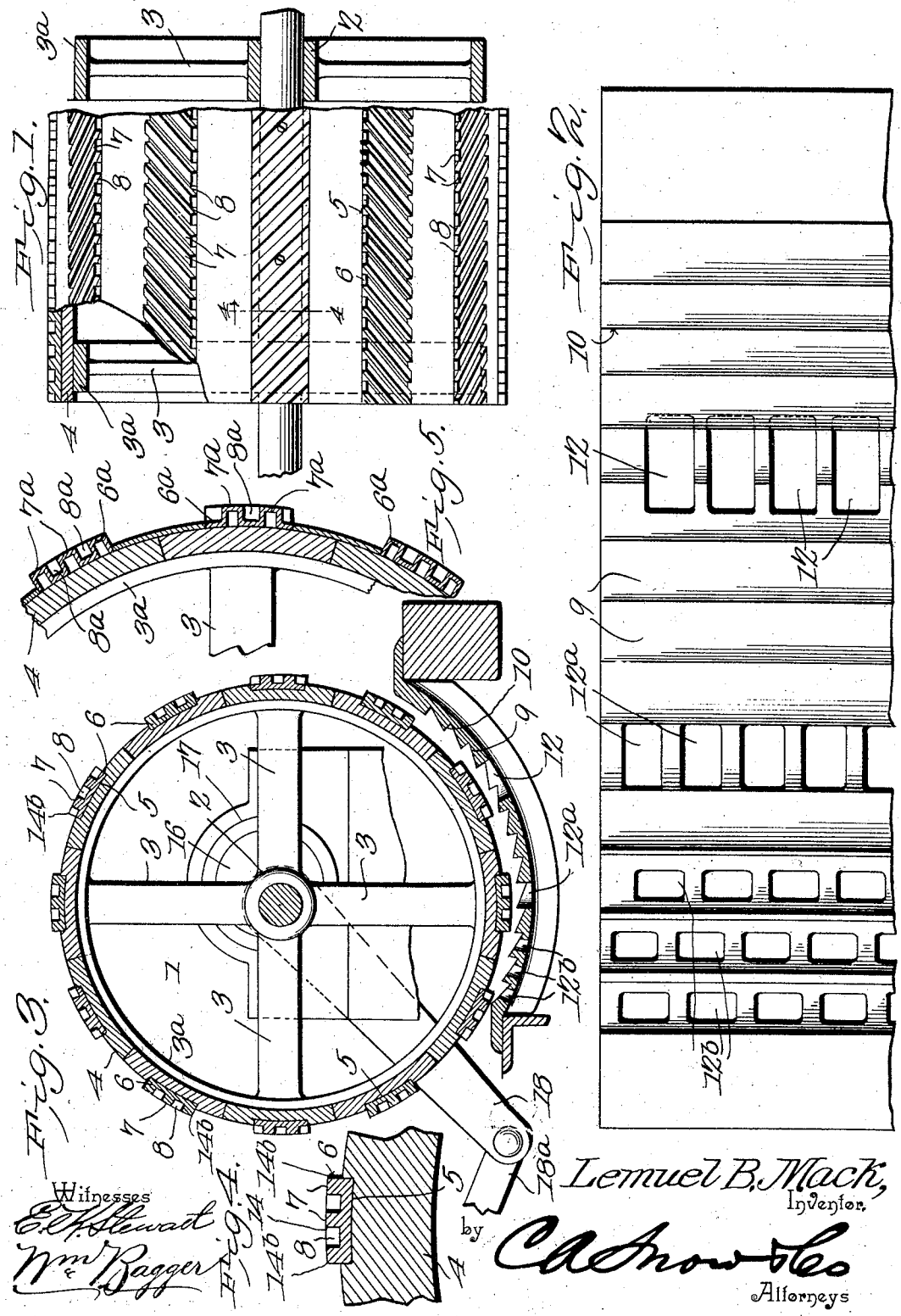

UNITED STATES PATENT OFFICE.

LEMUEL B. MACK, OF WALLA WALLA, WASHINGTON.

THRESHING APPARATUS.

SPECIFICATION forming part of Letters Patent No. 768,472, dated August 23, 1904.

Application filed August 18, 1903. Serial No. 169,918. (No model.)

*To all whom it may concern:*

Be it known that I, LEMUEL B. MACK, a citizen of the United States, residing at Walla Walla, in the county of Wallawalla and State of Washington, have invented a new and useful Threshing Apparatus, of which the following is a specification.

This invention relates to threshing apparatus, and more especially to threshing apparatus of that class which is used in connection with harvesting machinery for the purpose of performing the cutting and threshing operations simultaneously.

When threshing mechanism is used in connection with cutting apparatus, the latter is usually of that kind which is known as "headers," and I have shown such a combined header and threshing device in a companion application of even date with this present application. In this present application I shall describe and claim the peculiar construction of the threshing mechanism which I deem most appropriate to be used in this connection and which I have practically demonstrated to be successful.

Threshing mechanism as usually understood includes a toothed or spiked cylinder and a similarly toothed or spiked concave between which the grain must pass, it being thereby subjected to a violent beating for the purpose of dislodging the grains from the heads. Such threshing mechanism is also usually understood as comprising separating means whereby the grain is separated from chaff and impurities. The principal objection to the use of threshing mechanism of this class in connection with cutting apparatus is the excessive power required to operate the cutting mechanism and the threshing mechanism in conjunction with each other. While this item may be of little importance to those who own extremely large farms and who either have at their disposal a large number of draft-animals or who may provide traction-engines in order to operate the machinery, the question is a very important one to those who are not able to provide the needed power at the precise time when it is wanted—a period which does not extend beyond a few days.

Hence an important object of my invention is to provide a threshing mechanism, or, perhaps, more properly a mechanism for removing the grain and chaff from the heads of the severed straw, which may be operated with a comparatively very slight expenditure of power, and yet in an extremely thorough and perfect manner, so that no waste shall occur.

Another object of my invention is to provide a device of this class which shall be inexpensive and which may be applied to headers or other harvesting-machines of ordinary construction.

With these and other ends in view my invention consists in the improved construction, arrangement, and combination of parts, which will be hereinafter fully described, and particularly pointed out in the claims.

In the accompanying drawings, Figure 1 is a side elevation of a portion of a cylinder constructed in accordance with the principles of my invention. Fig. 2 is a plan view of a concave adapted to coöperate with said cylinder enlarged. Fig. 3 is a vertical transverse sectional view showing the cylinder and concave in their related operative positions. Fig. 4 is a transverse sectional detail view taken on the line 4 4 in Fig. 1. Fig. 5 is a transverse sectional detail view illustrating a modification.

Corresponding parts in the several figures are indicated by similar numerals of reference.

1 designates my improved cylinder, the body of which may be constructed in any suitable convenient manner. As shown in the accompanying drawings, it comprises a plurality of hubs 2, carrying spokes 3 and rims 3ª, which support the cylindrical drum or body 4. Said drum or body is provided with a plurality of longitudinal grooves or recesses 5, in which are seated the rubbing plates or strips 6, the faces of which are diagonally corrugated, as shown at 7, the corrugations of alternate plates or strips being preferably in opposite directions, as will clearly appear by reference to Fig. 1 of the drawings. The plates or strips 6 are to be secured in the grooves 5 detachably by means of screws, bolts, or other suitable means. The dimensions of the related parts are such that the bodies of the strips or plates 6 shall be seated in the recesses 5, as clearly shown in Fig. 3, while the ribs 7, forming the corrugations, are extended beyond the periphery of the ungrooved portion of the cylindrical body 5. This is an important feature of the device, inasmuch as if the strips or plates, with the corrugations thereon, were secured directly upon the exterior face of the cylinder, and thus permitted to project beyond the perimeter of the cylindrical drum, the depth of the intermediate spaces, which have been designated 8, will be increased by the thickness of the plates 5, which will interfere seriously with the successful operation of the device. In other words, in order to operate successfully, the ribs which constitute the corrugations 7 must be of a certain thickness, to which must be added the thickness of the plates upon which said ribs are formed. If the combined thickness of the corrugations and the plates were permitted to extend beyond the perimeter of the cylinder, the intermediate spaces 8 would afford lodgement against the edges of the plates 6 for ears of grain, the presence of which in these recesses would prevent the cylinder from taking the feed with the requisite readiness and power. Thus by seating the corrugated plates or strips in recesses of the proper depth a serious source of trouble is avoided and a successfully operative device is produced.

I would have it distinctly understood that I do not limit myself to the precise structural details of the cylinder which have been just set forth. Many other forms of construction might be resorted to in order to attain the desired end, and I therefore reserve the right to any modifications within the scope of my invention. One such modification has been illustrated in Fig. 5 of the drawings, by reference to which it will be seen that the plates or strips (here designated 6$^a$) having the diagonal corrugations 7$^a$ are struck up from plates of sheet metal and are secured directly upon the exterior face of the cylinder without previously grooving the latter. In this case I fill the intervening spaces 8$^a$ with sheet-metal strips 8$^b$ in order that only the thickness of the corrugations 7$^a$ shall be permitted to protrude from what may be denominated the "smooth" face of the cylinder. Very thin castings may also be employed in place of sheet metal, if preferred, the main point being that only the ribs or corrugations which are of a predetermined height exactly suited to the material that is to be operated upon shall be permitted to protrude beyond the smooth face of the cylinder.

The concave which is used in connection with my improved cylinder may be composed of a single or it may be made up of a plurality of suitably-supported strips or plates. Primarily the concave is provided with a plurality of ratchet-like ribs which are parallel to the axis of the cylinder and each of which comprises a gradually-inclined portion 9 and an abrupt wall 10. These ratchet-like ribs extend over the entire width of the concave, and the latter is provided with a plurality of openings, of which in the accompanying drawings three separate series have been shown. First the series of openings 12 are disposed closely together and near the intake side of the concave, and the said openings are of a size to extend over somewhat more than the width of one of the ribs. In other words, said openings may be described as beginning adjacent to the abrupt rear wall 9 of one of the ribs and extending over a space which includes the entire inclined portion of said rib, as well as the abrupt wall, and a portion of the inclined portion 9 of the rib next behind. The second series of openings 12$^a$ are separated from the first series by several of the ribs 9 10, and these openings 12$^a$ are of a width to take in the space which would be occupied by a single rib. One or more of the inclined ribs separate this second series of openings from a third series 12$^b$. Of this third series I have shown three rows, the width of said openings 12$^b$ being less than the width of the inclined portion 9 of one of the ribs, and these three rows of openings are extended through three adjacent ribs, as will be clearly shown in Fig. 2 of the drawings. By this construction the cylinder coacting with the concave will draw the grain lengthwise between said cylinder and concave and the sharp-edged corrugations of the cylinder will coöperate with the inclined ribs of the concave to rub loose the grain and cause it to leave the heads, the grain and chaff finding a ready escape through the several series of openings. The reason for the exact arrangement of the openings herein shown, the larger ones being disposed at the front, is simply this: that it is imperatively important to provide openings sufficiently large to permit of the escape of grain and chaff as soon as loosened from the heads at the earliest possible stage. It is important, however, that separation should continue as the operation progresses; but it becomes important to gradually diminish the size of the openings in order that while the grain and chaff may be freely permitted to pass the straw, which at this later stage has been bruised and broken up, shall be prevented from passing through the concave along with the grain. This object I find is best accomplished by the herein-described construction of the concave.

The corrugations formed upon the strips or plates attached to the cylinder are preferably approximately rectangular in cross-section, as will be clearly seen in Fig. 4, so that said corrugations 7 shall present sharp edges 14 at their corners, as well as at their ends 14$^b$. These sharp edges will be found effective in feeding or drawing the grain between the cylinder and concave, and inasmuch as these edges in the course of time are apt to become dulled the strips or plates 6, upon which they are formed, may, when desired, be simply reversed end for end in order that the edges heretofore not exposed may be brought into effective use. The life of the cylinder is thereby largely increased.

It will be understood that by my improved construction the threshing or removal of the grains from the heads is mainly accomplished by the concave, the cylinder acting principally in the nature of a feeder, whereby the grain will be drawn between the coacting surfaces of the cylinder and concave, which coöperate, not to beat, but rather to rub, the grain from the heads. This I consider a feature of extreme importance in a device of the class under which my invention belongs—namely, threshing attachments for harvesting-machines—inasmuch as threshing mechanism of the ordinary kind, usually involving heavy toothed cylinders and concaves, requires to be operated at a speed, and consequently at an expense of power, which is greatly in excess of that required by my invention. Again, owing to the absence of high speed, there will be less jolting, and my improved threshing mechanism being made of an extreme width to occupy the entire width of the harvesting-machine with which it is in practice connected, the absence of teeth is a very important item, for the reason that teeth when present in threshing apparatus of this class are apt not only to be bent or broken either by heavy weeds which may be intermixed with the grain, but even when the grain itself is exceptionally heavy. Similarly when much jolting is experienced it often happens that the teeth of the cylinder and the concave when present will strike against each other, and thus disable the apparatus.

I desire it to be understood that the construction of the concave, as well as that of the cylinder, may be considerably modified within the scope of my invention. Thus it may be, as stated, made up of a single or of a plurality of pieces. In the latter case separate supporting means will be required, while in the former case the casting constituting the concave will be provided with flanges or supporting means adapted to engage the framework of the machine in which it is used; but such details are mostly within the province of the skilled mechanic and have not been shown in detail in the accompanying drawings.

The shaft of the cylinder is journaled eccentrically in sleeves 16, which are mounted in boxings 17 and which are provided at their ends with cranks 18, whereby the bearing-sleeves 16 may be turned, so as to adjust the position of the cylinder-shaft and the cylinder with relation to the concave. It is important that, as shown in Fig. 3 of the drawings, the perimeter of the cylinder at the receiving end should be spaced from the concave in excess of the spacing at the discharge end. Thus in operation the grain passing between the cylinder and the concave will be subjected to a rubbing action, which is found extremely effective in removing all the grain from the heads, it being practically impossible for even a single grain to escape at the discharge between the cylinder and concave. This arrangement is also important, for the reason that at the intake end the heads of grain will be bunched together, while as the grain and chaff is gradually removed from the same at the discharge end the body of material to be operated upon by the threshing mechanism is considerably reduced. Consequently by spacing the cylinder and the concave close together at the discharge end heads containing even a few grains will still be operated upon, with the result that practically all the grain is extracted and permitted to escape through the openings in the concave prior to leaving the threshing mechanism. Means for disposing of the grain and chaff will of course be located beneath the concave; but such means are well known and will not be further described in this application.

One or both of the adjusting-cranks 18 of the cylinder are to be connected with link-rods 18$^a$, reaching to a point convenient to the operator of the machine carrying my improved threshing mechanism in order that adjustment of the cylinder may be effected at any time according to the condition of the grain which is being operated upon.

I desire it to be understood that while I have in the foregoing described a simple and preferred form of my invention I do not by any means confine myself to the structural details herein set forth, but reserve the right to any changes, alterations, and modifications which may be resorted to within the scope of my invention and without departing from the spirit or sacrificing the efficiency of the same.

Having thus described my invention, I claim—

1. A concave having a plurality of ratchet-like ribs and a plurality of series of perforations, the size of the perforations in said series decreasing from the intake end toward the discharge end of the concave.

2. A concave having a plurality of ratchet-like ribs and a plurality of series of perforations, the perforations of the series nearest the intake end being of a width exceeding that of a single ratchet-like rib, the perforations of the second series being of a width corresponding to the width of one of the ratchet-like ribs, and the perforations near the discharge end being of a width less than that of a single ratchet-like rib.

3. A threshing-cylinder comprising a body having spaced rows of sharp-edged oblique ribs, the obliquity of adjacent rows being reverse, the bottom of the spaces between the ribs being of the same curvature as the cylinder and at the same radial distance from its central line as its surface, in combination with a coacting concave having a plurality of ratchet-like sharp-edged ribs parallel to the axis of the cylinder, said concave being disposed eccentrically with relation to the cylinder, said cylinder and concave being spaced farther apart at the intake than at the discharge end, and said concave being provided at the intake end with openings of a length exceeding the width of the ratchet-like ribs and at the discharge end with openings of a length less than the width of said ribs.

In testimony that I claim the foregoing as my own I have hereto affixed my signature in the presence of two witnesses.

LEMUEL B. MACK.

Witnesses:
W. D. McCULLEY,
R. B. MITCHELL.